United States Patent
Murphy et al.

(10) Patent No.: US 9,015,396 B2
(45) Date of Patent: Apr. 21, 2015

(54) REDUCING LATENCY IN A PERIPHERAL COMPONENT INTERCONNECT EXPRESS LINK

(71) Applicant: Apple Inc., Cupertino, CA (US)

(72) Inventors: Michael W. Murphy, Menlo Park, CA (US); Joshua P. de Cesare, Campbell, CA (US); Timothy R. Paaske, San Jose, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 13/622,266

(22) Filed: Sep. 18, 2012

(65) Prior Publication Data

US 2014/0082242 A1    Mar. 20, 2014

(51) Int. Cl.
*G06F 13/24*    (2006.01)
*G06F 1/32*    (2006.01)
*G06F 1/00*    (2006.01)

(52) U.S. Cl.
CPC .............. *G06F 13/24* (2013.01); *G06F 1/3253* (2013.01); *Y02B 60/1235* (2013.01)

(58) Field of Classification Search
USPC .......... 710/260–262, 266–267, 105–106, 15, 710/17–19; 713/300, 320, 322–324
See application file for complete search history.

(56) References Cited

U.S. PATENT DOCUMENTS

| | | | |
|---|---|---|---|
| 2008/0068239 A1* | 3/2008 | Anderson et al. | 341/139 |
| 2008/0267001 A1* | 10/2008 | Haraden et al. | 365/239 |
| 2008/0288798 A1 | 11/2008 | Cooper et al. | |
| 2009/0077394 A1* | 3/2009 | Tsai et al. | 713/310 |
| 2009/0172434 A1* | 7/2009 | Kwa et al. | 713/320 |
| 2009/0204974 A1* | 8/2009 | Feehrer | 719/314 |
| 2012/0210032 A1 | 8/2012 | Wang et al. | |
| 2012/0324258 A1* | 12/2012 | Branover et al. | 713/320 |
| 2014/0006826 A1* | 1/2014 | Wagh | 713/323 |

FOREIGN PATENT DOCUMENTS

EP    2048571    4/2009

OTHER PUBLICATIONS

"L1 PM Substates with CLKREQ". PCI-SIG Engineering Change Notice. Aug. 15, 2012. Intel Corporation et al.*
Budruk, Ravi, et al. "PCI Expres sSystem Architeture". 2003. Mindshare, Inc. Addison-Wesley Developer's Press. ISBN: 0-321-15630-7. pp. 329-331.*

* cited by examiner

*Primary Examiner* — Thomas J Cleary
(74) *Attorney, Agent, or Firm* — Park, Vaughan, Fleming & Dowler LLP; A. Richard Park

(57) ABSTRACT

A method and system are described for reducing latency in a peripheral component interconnect express (PCIe) link between a host and an endpoint. In the described embodiments, an interrupt is issued from the endpoint to the host using the PCIe link. Then, while the interrupt is pending at the host, the PCIe link is prevented from entering a power-saving mode with an exit latency greater than a predetermined time period.

20 Claims, 3 Drawing Sheets

REDUCING LATENCY IN A PERIPHERAL COMPONENT INTERCONNECT EXPRESS LINK

BACKGROUND

1. Field

The described embodiments relate to reducing latency on a data link. More specifically, the described embodiments relate to reducing latency on a peripheral component interconnect express link between an endpoint and a host.

2. Related Art

Many modern computer systems use a peripheral component interconnect express (PCIe) link to communicate between a host and an endpoint. When a PCIe link is unused for a period of time, an endpoint may try to save power by putting the PCIe link into a power-saving mode. Typically, the more power that is saved by a power-saving mode, the longer the amount of time it takes for the PCIe link to exit the power-saving mode and become operational again.

When an operating system on a host tries to communicate with an endpoint over a PCIe link that is in a power-saving mode, the operating system will have to wait for the PCIe link to exit the power-saving mode to allow communication between the host and the endpoint to resume. This delay while waiting for the PCIe link to resume may exceed the allowable delay tolerances for some operating systems, resulting in unexpected or unacceptable behavior and possibly an undesirable user experience.

BRIEF DESCRIPTION OF THE FIGURES

In the figures, like reference numerals refer to the same figure elements.

DETAILED DESCRIPTION

Figure 1:
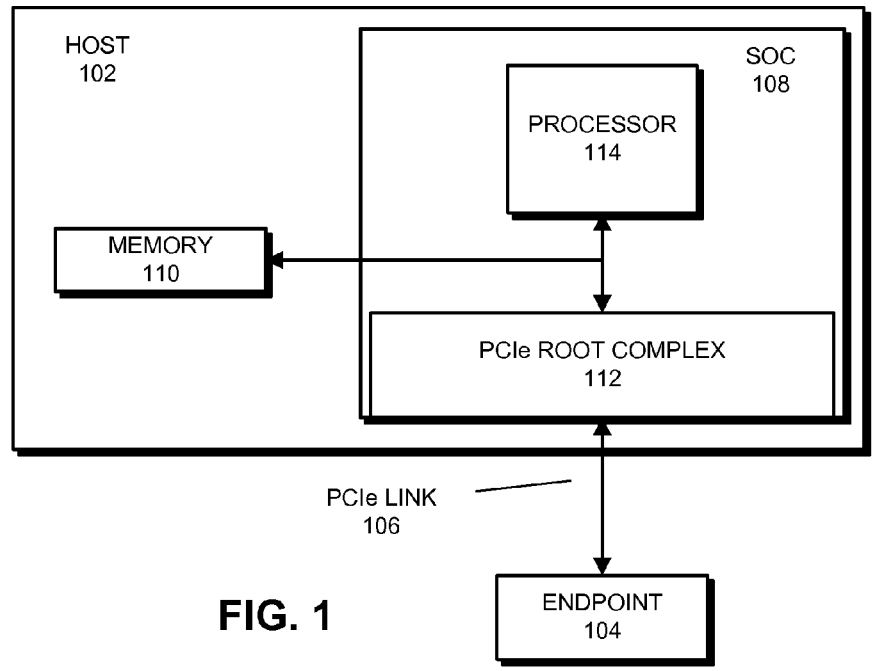
FIG. 1 presents a block diagram illustrating a PCIe link between a host and an endpoint in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by an endpoint and/or host with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that, in the described embodiments, the computer-readable storage medium does not include non-statutory computer-readable storage mediums such as transmission signals.

The methods and processes described in this detailed description can be included in hardware modules. For example, the hardware modules can include, but are not limited to one or more application-specific integrated circuit (ASIC) chips, field-programmable gate arrays (FPGAs), other programmable-logic devices, dedicated logic devices, and microcontrollers. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an endpoint and/or host with computing capabilities reads and executes the code and/or data stored on the computer-readable storage medium, the endpoint and/or host performs the methods and processes embodied as data structures and code and stored within the computer-readable storage medium. For example, in some embodiments, a processing subsystem can read the code and/or data from a memory subsystem that comprises a computer-readable storage medium and can execute code and/or use the data to perform the methods and processes.

In the following description, we refer to "some embodiments." Note that "some embodiments" describes a subset of all of the possible embodiments, but does not always specify the same subset of embodiments.

Overview

The described embodiments perform operations for reducing latency in a peripheral component interconnect express (PCIe) link between a host and an endpoint. In the described embodiments, the host can include any host device that can communicate over a PCIe link with an endpoint. Generally, the host includes a root complex that couples a processor and memory on the host to the PCIe link. An endpoint is generally a device that communicates with a host over a PCIe link. The PCIe link may be a PCIe link conforming to the PCI special interest group (PIC-SIG) PCIe specification (e.g., PCI Express 3.0 Base specification revision 3.0).

The endpoint can exchange data and/or other information with the host over the PCIe link. However, when the PCIe link remains idle for a period of time, the endpoint may implement one of the available power-saving modes in order to reduce the power consumed by the PCIe link while it is not being used. An endpoint may reduce the power consumption of the PCIe link by transitioning from the L state L0 (highest power state) to a lower power L state (e.g., L1 sub-states L1.0, L1.1 and L1.2) as defined by the PCIe specification.

The L1 sub-states allow the PCIe link to save energy by putting one or more subsystems of the link into one or more lower power consumption states. However, there is a latency in exiting from the L1 sub-states to the L0 state. This exit latency is the amount of time that it takes for the PCIe link to power back up so that the host and endpoint can communicate over the link again. Generally, the greater the reduction in the power usage for an L state (e.g., an L1 sub-state), the longer the latency in transitioning to the L0 state to bring the PCIe link back up.

One other method that an endpoint can use to achieve power management is the latency tolerance reporting (LTR) mechanism. An endpoint can send an LTR value to the root complex informing the root complex of the latency that the endpoint can tolerate in bringing the PCIe link up from a power-saving mode. The root complex then uses the LTR value to manage the power-saving mode(s) for the PCIe link During operation, in addition to exchanging data with the host, an endpoint may send a message to the host for which the endpoint expects a response. For example, the endpoint may issue an interrupt to the host and expect that the operating system on the host will eventually respond to the endpoint based on the interrupt. However, if the operating system on the host does not respond to the interrupt until after the PCIe link has become idle and entered a power-saving mode, the operating system will have to wait for the PCIe link to exit the power-saving mode (e.g., the exit latency). During this period of time, the operating system on the host may be blocked from performing other operations, resulting in unexpected or unwanted behavior on the host.

In described embodiments, when a host and endpoint first communicate over a PCIe link, the host informs the endpoint of the host operating system's latency tolerance (e.g., a maximum latency the operating system can wait for a response from the endpoint). The maximum latency of the host operating system may be based on factors including but not limited to a maximum period of time that the operating system on the host can wait for a response from the endpoint, or a statistical maximum latency that may be based on calculated, measured or simulated performance of the host in one or more sample usage configurations.

After the endpoint is informed of the latency tolerance of the host operating system, then when the endpoint expects a response from the host operating system, the endpoint acts based on the latency requirements of the host operating system. For example, if the latency tolerance of the host operating system is 30 microseconds, and the exit latency for L sub-state L1.0 to L state L0 is less than 30 microseconds, while the exit latencies for L sub-states L1.1 and L1.2 to L state L0 are greater than 30 microseconds, then when the endpoint expects a response from the operating system on the host, the endpoint may prevent the PCIe link from entering sub-states L1.1 and L1.2, only allowing the PCIe link to enter L0 or L1.0. In some embodiments, the endpoint may not allow the PCIe link to enter the L1 state. Additionally, in some embodiments, the endpoint may request entry for the PCIe link to the L1 state and when the host acknowledges the request, the endpoint would allow the PCIe link to enter the L1.0 sub-state by not releasing CLKREQ# and inhibiting itself from entering the L1.1 or L1.2 sub-states. Lastly, the endpoint could send a message to the root complex changing the LTR value to a value based on the latency tolerance of the host operating system.

When the endpoint is no longer expecting a response from the operating system on the host (e.g., because the expected response was received and no further responses are expected), the endpoint can revert to its previous latency requirements (e.g., based on its own latency tolerance). The endpoint may allow the PCIe link to enter any L state or sub-state as appropriate to the endpoint's own power saving and latency requirements. Additionally, if while the endpoint was expecting a response from the operating system on the host, the endpoint sent a message to the root complex changing the LTR value to a value based on the latency tolerance of the host operating system, then the endpoint may send a message to the root complex changing the LTR value back to a value based on the endpoint's own requirements.

Note that the endpoint may track when it is expecting a response from the operating system on the host and is therefore altering its latency requirements for the PCIe link to honor the latency tolerance of the operating system on the host. The endpoint may use any method to track when it is expecting a response from the operating system on the host, including but not limited to storing this information as state information in a memory on the endpoint, or using any other information stored on the endpoint to track when a response from the host OS is expected, such as determining if there are outstanding interrupts from the endpoint that the host has not responded to yet.

Link Environment

FIG. 1 presents a block diagram illustrating a PCIe link between a host and an endpoint in accordance with the described embodiments. Host 102 is connected to endpoint 104 using PCIe link 106. Host 102 includes system on a chip (SOC) 108 coupled to memory 110, and SOC 108 includes PCIe root complex 112 coupled to processor 114 and memory 110.

Host 102 can be (or can be included in) any device that communicates with an endpoint using a PCIe link. For example, host 102 can be (or can be included in) a laptop computer, desktop computer, a server, an appliance, a subnotebook/netbook, a tablet computer, a cellular phone, a personal digital assistant (PDA), a smartphone, or another device. Note that host 102 can include other subsystems (not shown) including but not limited to communications subsystems, display subsystems, data collection subsystems, audio and/or video subsystems, alarm subsystems, media processing subsystems, input/output (I/O) subsystems, and/or one or more other processing subsystems (e.g., CPUs), or power subsystems (e.g., battery, battery management unit, and/or other power management subsystems).

Endpoint 104 is any endpoint that can communicate with a host over a PCIe link. Endpoint 104 may be or may include one or more devices or systems (e.g., peripherals) that perform functionalities including, for example, wireless communications, storage, and/or graphics processing. Note that in some embodiments, endpoint 104 may be located inside host 102, while in some embodiments endpoint 104 may be located externally to host 102. Endpoint 104 will be discussed in more detail below with respect to FIG. 2.

PCIe link 106 is a link that allows communication between endpoint 104 and host 102 using a PCIe specification such as PCIe base specification 3.0 by PCI-SIG.

SOC 108 is a system on a chip that includes a processor and PCIe root complex, and may include other subsystems (not shown) such as memory, counters, clocks, interface regulators, power management circuits, and/or analog and/or digital interfaces. PCIe root complex 112 connects processor 114 and memory 110 to PCIe link 106. Note that in some embodiments PCIe root complex 112 may be implemented on a separate SOC or microcontroller, or in some embodiments, PCIe root complex 112 may be omitted and the functionality of PCIe root complex 112 may be implemented on processor 114 (e.g., software operating on processor 114). Additionally, note that in some embodiments, more than one PCIe link may be connected to PCIe root complex 112.

Processor 114 includes one or more devices configured to perform computational operations. For example, processor 114 can include one or more microprocessors each with one or more cores, application-specific integrated circuits (ASICs), microcontrollers, and/or programmable-logic devices. In some embodiments, some or all of the functionality of SOC 108 may be replaced by one or more circuits that may include one or more microprocessors and/or multicore processing systems.

Memory 110 includes one or more devices for storing data and/or instructions for subsystems in host 102 including those on SOC 108 such as processor 114 and/or PCIe root complex 112. Memory 110 can include dynamic random access memory (DRAM), static random access memory (SRAM), and/or other types of memory, and may include mechanisms for controlling access to the memory. In some embodiments, memory 110 includes a memory hierarchy that comprises one or more caches coupled to a memory (not shown) in SOC 108. In some embodiments, memory 110 is coupled to one or more high-capacity mass-storage devices (not shown). For example, memory 110 can be coupled to a magnetic or optical drive, a solid-state drive, or another type of mass-storage device. In these embodiments, memory 110 can be used by host 102 as fast-access storage for often-used data, while the mass-storage device is used to store less frequently used data.

Note that, although only one endpoint is depicted in FIG. 1, in alternative embodiments, more than one endpoint may be coupled by PCIe links to host 102 and PCIe root complex 112.

Endpoint

Figure 2:
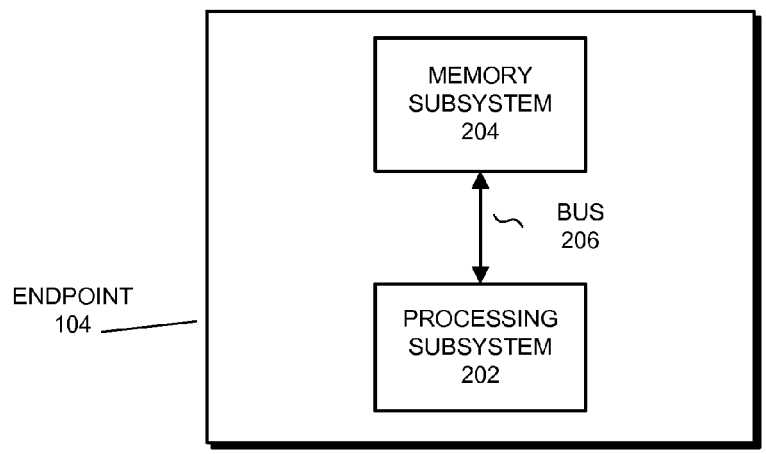
FIG. 2 presents a block diagram illustrating an endpoint in accordance with the described embodiments.

FIG. 2 presents a block diagram illustrating an endpoint in accordance with the described embodiments. Endpoint 104 includes processing subsystem 202 and memory subsystem 204 coupled to bus 206. Endpoint 104 may include other subsystems (not shown) such as subsystems for wireless communications, mass storage, and/or graphics processing, in addition to subsystems (not shown) for coupling to and communicating over PCIe link 106

Processing subsystem 202 is any processing subsystem configured to perform computational and/or logic operations that can be used in an endpoint, and may be implemented in any technology, including but not limited to any type of hardware module, software, firmware, and/or any other general purpose or special purpose logic. Processing subsystem 202 may include but is not limited to one or more central processing units (CPUs), microprocessors, application-specific integrated circuit (ASIC) chips, field-programmable gate arrays (FPGAs), other programmable-logic devices, dedicated logic devices, and microcontrollers.

Memory subsystem 204 includes one or more devices for storing data and/or instructions for processing subsystem 202 and other subsystems (not shown) in endpoint 104. For example, memory subsystem 204 can include dynamic random access memory (DRAM), static random access memory (SRAM), read-only memory (ROM), erasable programmable read-only memory (EPROM), flash memory, and/or other types of memory. In addition, memory subsystem 204 can include firmware and mechanisms for controlling access to memory or other subsystems (not shown) in endpoint 104.

Processing subsystem 202 and memory subsystem 204 are coupled together using bus 206. Bus 206 is an electrical, optical, or electro-optical connection that these subsystems and, in some embodiments, other subsystems (not shown) in endpoint 104 can use to communicate commands and data among one another. Although only one bus 206 is shown for clarity, different embodiments can include a different number or configuration of electrical or other connections among the subsystems.

Although processing subsystem 202 and memory subsystem 204 are shown as separate subsystems in FIG. 2, in some embodiments, one or both of these subsystems can be integrated into one or more other subsystems in endpoint 104. Furthermore, in some embodiments, endpoint 104 may include one or more additional processing subsystems 202 and/or memory subsystems 204, and although we use specific subsystems to describe endpoint 104, in alternative embodiments, different subsystems may be present in endpoint 104. Additionally, although processing subsystem 202 and memory subsystem 204 are depicted as separate subsystems in FIG. 2, in some embodiments these and other subsystems (not shown) in endpoint 104 may be implemented on one integrated circuit.

Operating System/Firmware

Figure 3:
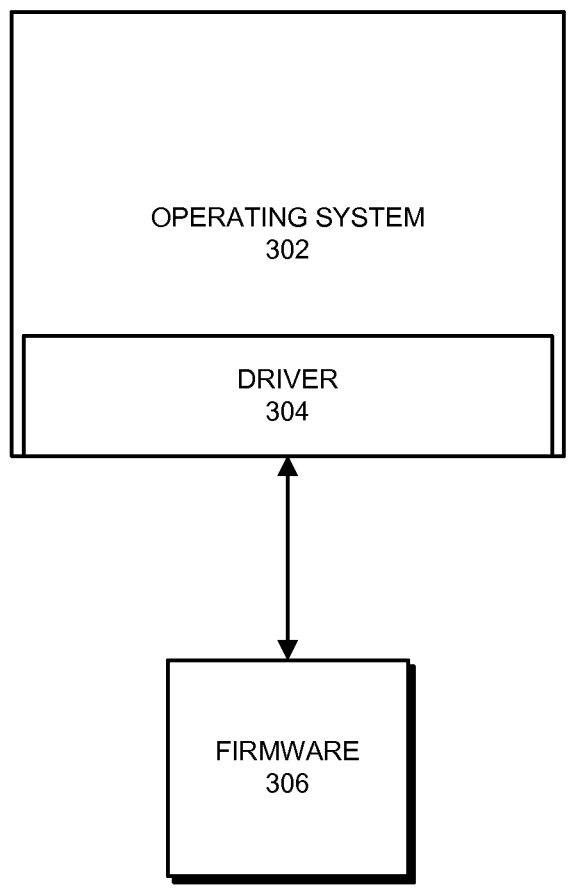
FIG. 3 presents a block diagram illustrating an operating system with a driver operating on the host coupled to endpoint firmware on the endpoint over a PCIe link in accordance with the described embodiments.

FIG. 3 presents a block diagram illustrating an operating system with a driver operating on the host coupled over a PCIe link to endpoint firmware operating on the endpoint in accordance with the described embodiments.

In some embodiments, operating system 302 is stored (as program code) in memory 110 and executed by processor 114. Generally, operating system 302 serves as an intermediary between system hardware in host 102 (e.g., subsystems including PCIe root complex 112) and applications executed by processor 114, which can be, for example, an email application, a web browser, and a game application. Operating system 302 also includes driver 304 which enables operating system 302 and other applications operating on processor 114 to communicate with endpoint 104. Operating system 302 can be, but is not limited to, the OS X operating system, or iOS, both from Apple Inc. of Cupertino, Calif.; the FreeBSD operating system from The FreeBSD Foundation of Boulder, Colo.; or another operating system. Operating systems and their general functions are known in the art and hence are not described in detail.

Endpoint 104 includes firmware 306 which may be preloaded on endpoint 104 and/or dynamically loaded by driver 304, and generally includes data and/or programming used to operate and control endpoint 104. Firmware 306 may be stored in memory subsystem 204 in read-only memory (ROM), programmable read-only memory (PROM), and/or erasable programmable read-only memory (EPROM), and executed on processing subsystem 202. In some embodiments, firmware 306 may be partially or completely replaced by software stored in memory subsystem 204 and operating on processing subsystem 202, and/or one or more hardware modules (not shown) in endpoint 104.

Reducing Latency in a PCIe Link

Figure 4:
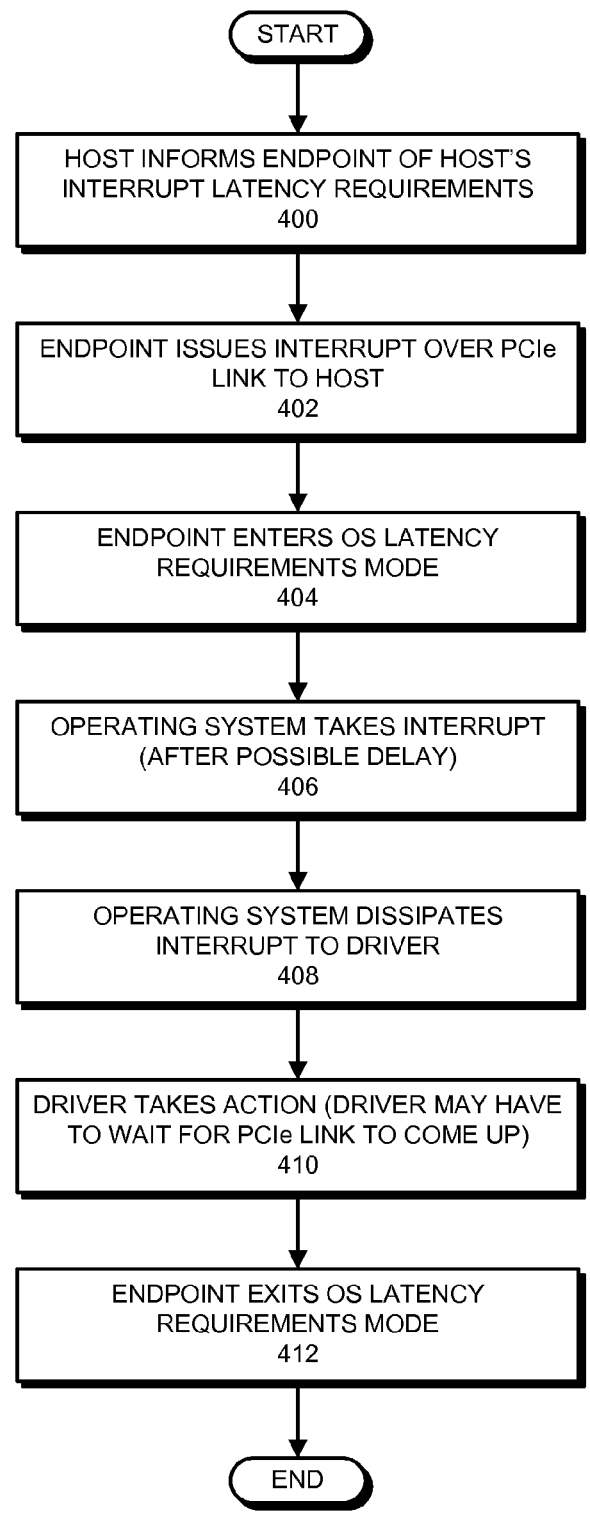
FIG. 4 presents a flowchart illustrating a process reducing latency in a PCIe link in accordance with the described embodiments.

FIG. 4 presents a flowchart illustrating a process for reducing latency in a PCIe link in accordance with the described embodiments. The operations shown in FIG. 4 are performed by a host, such as host 102, and an endpoint, such as endpoint 104. The process shown in FIG. 4 starts at step 400 when host 102 informs endpoint 104 of the interrupt latency requirements of operating system 302. Endpoint 104 may store this information in memory subsystem 204. Then, in step 402, endpoint 104 issues an interrupt over PCIe link 106 to host 102.

Note that when an interrupt, such as the one issued by endpoint 104 to host 102, is received by operating system 302, operating system 302 may be configured to complete the task it is currently working on before responding to the interrupt. As a result, the interrupt may be logged (e.g., in an interrupt controller on SOC 108) until operating system 302 can handle the interrupt (e.g., operating system 300 dispatches the interrupt to driver 304) and driver 304 operating on processor 114 communicates with endpoint 104 using PCIe link 106 to respond to the interrupt.

At step 404, endpoint 104 uses the interrupt latency tolerance of operating system 302 to set the latency tolerance for PCIe link 106. In some embodiments, endpoint 104 accomplishes this by sending a message to PCIe root complex 112 changing the LTR value to a value based on the interrupt latency requirements of operating system 302. For example, driver 304 may send a message to firmware 306 to set the LTR value for PCIe link 106 to a value based on the interrupt latency requirements of operating system 302. In some embodiments, instead of changing the LTR value, endpoint 104 will prevent PCIe link 106 from entering an L1 sub-state that has an exit latency to the L0 state larger than the interrupt latency tolerance of operating system 302. For example, if the interrupt latency tolerance of operating system 302 is 30 microseconds and the L1 sub-state L1.0 has an exit latency to the L0 state of 16 microseconds, and sub-states L1.1 and L1.2 each have an exit latency to the L0 state greater than 30 microseconds, then at step 404, endpoint 104 will enter a state that allows PCIe link 106 to enter the L0 state or L1.0 sub-state, but not sub-states L1.1 or L1.2.

At step 406, operating system 302 takes the interrupt issued by endpoint 104. Note that the delay before operating system 302 begins to act on the interrupt may depend on factors including what application and/or instruction(s) are executing at the time the interrupt is received and how operating system 302 is configured to handle interrupts. At step 408, operating system 302 dissipates the interrupt to driver 304, and then at step 410, driver 304 responds to endpoint 104 based on the interrupt. For example, if endpoint 104 is a networking device such as a WiFi subsystem, driver 304 may take actions that could include, but are not limited to, one or more of the following: sending or receiving packets to or from endpoint 104, processing packets that are newly received by endpoint 104, queuing new packets for transmission by endpoint 104, handling link maintenance issues, or updating DMA descriptors.

Note that at step 410, if PCIe link 106 has been inactive for a long enough period of time since the interrupt was sent by endpoint 104 to host 102, then PCIe link 106 may have entered a power-saving mode. If PCIe link 106 is in a power-saving mode, then driver 304 will have to wait for PCIe link 106 to become active (i.e., the exit latency) before driver 304 can communicate with endpoint 104.

At step 412, when endpoint 104 is no longer expecting a response from operating system 302, endpoint 104 resumes honoring its own latency tolerances. For example, if endpoint 104 changed its LTR value to a value based on the interrupt latency tolerance of operating system 302, endpoint 104 may change the LTR value back to a value based on its own latency tolerance. In the case where endpoint 104 is preventing PCIe link 106 from entering a more aggressive power-saving L state or sub-state based on the interrupt latency tolerance of operating system 302, then endpoint 104 may resume allowing PCIe link 106 to enter these states or sub-states based on its own latency tolerance.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for reducing a latency in a peripheral component interconnect express (PCIe) link between a host and an endpoint, comprising:
   issuing an interrupt from the endpoint to the host using the PCIe link; and
   while the interrupt is pending at the host, preventing the PCIe link from entering a power-saving mode from a set of power-saving modes with an exit latency greater than a predetermined time period, but permitting the PCIe link to enter at least one acceptable power-saving mode from the set of power-saving modes, wherein the exit latency for the at least one acceptable power-saving mode is equal to or less than the predetermined time period.

2. The method of claim 1, wherein:
the predetermined time period is determined based on information including an acceptable response delay for the host.

3. The method of claim 1, wherein:
preventing the PCIe link from entering the power-saving mode includes preventing the PCIe link from entering an L1 link state mode.

4. The method of claim 1, wherein:
preventing the PCIe link from entering the power-saving mode includes preventing the PCIe link from entering L1 link sub-state modes L1.1 and L1.2.

5. The method of claim 1, wherein:
preventing the PCIe link from entering the power-saving mode includes setting a latency tolerance reporting (LTR) value based on the predetermined time period.

6. The method of claim 1, wherein:
when the interrupt is no longer pending at the host, cease preventing the PCIe link from entering the power-saving mode with the exit latency greater than the predetermined time period.

7. The method of claim 1, wherein:
when the endpoint has no pending request at the host that requires a response from the endpoint, cease preventing the PCIe link from entering the power-saving mode with the exit latency greater than the predetermined time period.

8. An endpoint that reduces a latency in a peripheral component interconnect express (PCIe) link between a host and the endpoint, comprising:
   a processing subsystem in the endpoint, wherein the processing subsystem is configured to communicate with the host over the PCIe link and configured so that after an interrupt is issued by the endpoint to the host using the PCIe link and while the interrupt is pending at the host, the processing subsystem prevents the PCIe link from entering a power-saving mode from a set of power-saving modes with an exit latency greater than a predetermined time period, but permits the PCIe link to enter at least one acceptable power-saving mode from the set of power-saving modes, wherein the exit latency for the at least one acceptable power-saving mode is equal to or less than the predetermined time period.

9. The endpoint of claim 8, wherein:
the processing subsystem is configured to determine the predetermined time period based on information including an acceptable response delay for the host.

10. The endpoint of claim 8, wherein:
the processing subsystem is configured to prevent the PCIe link from entering the power-saving mode by preventing the PCIe link from entering an L1 link state mode.

11. The endpoint of claim 8, wherein:
the processing subsystem is configured to prevent the PCIe link from entering the power-saving mode by preventing the PCIe link from entering L1 link sub-state modes L1.1 and L1.2.

12. The endpoint of claim 8, wherein:
the processing subsystem is configured to prevent the PCIe link from entering the power-saving mode by setting a latency tolerance reporting (LTR) value based on the predetermined time period.

13. The endpoint of claim 8, wherein:
the processing subsystem is configured to cease preventing the PCIe link from entering the power-saving mode when the interrupt is no longer pending at the host.

14. A non-transitory computer-readable storage medium containing instructions that, when executed by a processing subsystem in an endpoint, cause the endpoint to perform a method for reducing a latency in a peripheral component interconnect express (PCIe) link between a host and the endpoint, the method comprising:
issuing an interrupt from the endpoint to the host using the PCIe link; and
while the interrupt is pending at the host, preventing the PCIe link from entering a power-saving mode from a set of power-saving modes with an exit latency greater than a predetermined time period, but permitting the PCIe link to enter at least one acceptable power-saving mode from the set of power-saving modes, wherein the exit latency for the at least one acceptable power-saving mode is equal to or less than the predetermined time period.

15. The computer-readable storage medium of claim 14, wherein:
the predetermined time period is determined based on information including an acceptable response delay for the host.

16. The computer-readable storage medium of claim 14, wherein:
preventing the PCIe link from entering the power-saving mode includes preventing the PCIe link from entering an L1 link state mode.

17. The computer-readable storage medium of claim 14, wherein:
preventing the PCIe link from entering the power-saving mode includes preventing the PCIe link from entering L1 link sub-state modes L1.1 and L1.2.

18. The computer-readable storage medium of claim 14, wherein:
preventing the PCIe link from entering the power-saving mode includes setting a latency tolerance reporting (LTR) value based on the predetermined time period.

19. The computer-readable storage medium of claim 14, wherein:
when the interrupt is no longer pending at the host, cease preventing the PCIe link from entering the power-saving mode with the exit latency greater than the predetermined time period.

20. The computer-readable storage medium of claim 14, wherein:
when the endpoint has no pending request at the host that requires a response from the endpoint, cease preventing the PCIe link from entering the power-saving mode with the exit latency greater than the predetermined time period.

* * * * *